Figure 1:
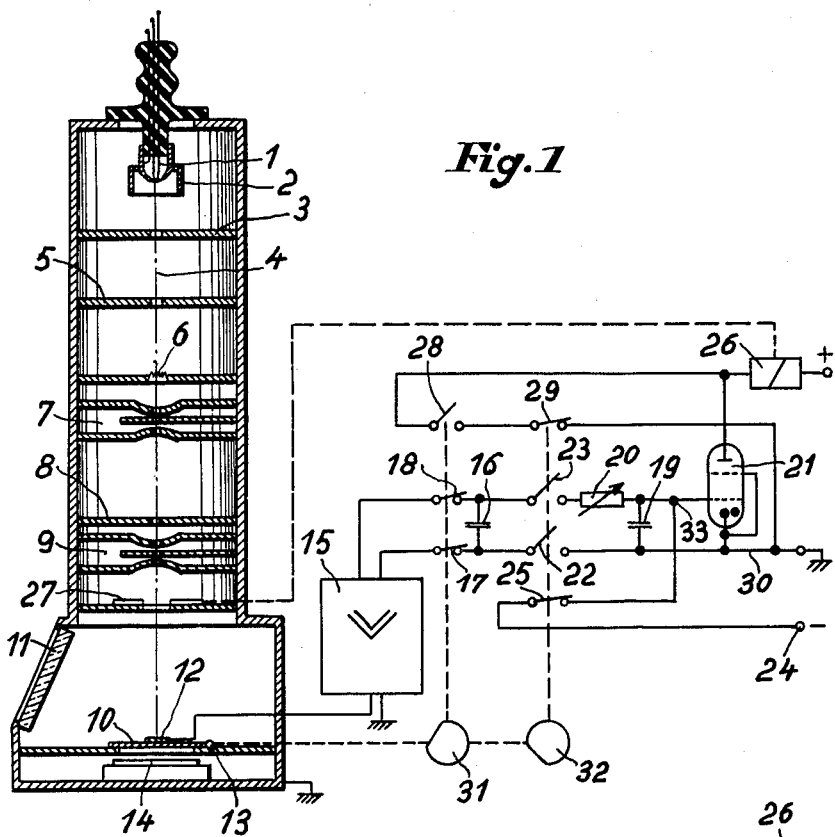

June 16, 1964

E. GÜTTER 3,137,791

MEANS FOR AUTOMATICALLY CONTROLLING THE EXPOSURE
TIME OF CHARGE CARRIER BEAM APPARATUS

Filed Sept. 6, 1960

INVENTOR
ERNST GÜTTER

BY Emery Whittemore Sandoe & Graham

ATTORNEYS 3,137,791
MEANS FOR AUTOMATICALLY CONTROLLING THE EXPOSURE TIME OF CHARGE CARRIER BEAM APPARATUS
Ernst Gütter, Oberkochen, Wurttemberg, Germany, assignor to Carl Zeiss, Wurttemberg, Germany
Filed Sept. 6, 1960, Ser. No. 54,117
Claims priority, application Germany Sept. 8, 1959
8 Claims. (Cl. 250—49.5)

This invention relates to an improved method and means for controlling the time of exposure of a photographic film to an impinging charge carrier beam in accordance with the current density of the beam.

In many applications of charge carrier beam apparatus, such as electron microscopes, it is necessary to expose photographic film to the charge carrier beam to produce a latent image which may be developed into a photograph. Unfortunately, such apparatus generally does not contain any device for determining the proper exposure time.

The required exposure time is either estimated solely on basis of the brightness of the final image of the fluorescent screen or determined by comparison of the light intensity of the image of the screen with a reference source of light of variable intensity. Estimating without any means of aid is very difficult and frequently leads to a non-uniform exposure. The use of the known exposure meter which operates with a source of comparison light is, on the one hand, very time consuming and, on the other hand, gives irregular deviations caused by subjective errors.

Electron microscopes have been constructed in which the fluorescent screen is used as a collector electrode to measure the entire beam current impinging thereon. This measurement is then used to manually set the exposure interval by means of a mechanical clock drive. In addition to the lack of automatic control, the devices known to the art are limited in the range of exposure. For example, with permissible density errors of ±10%, there can be covered merely a change in beam current of a ratio of 1:3. Also, erroneous measurements often occur through measuring the entire beam current impinging on the fluorescent screen. In such measurements, if the size of the object is smaller than the size of the fluorescent screen, excessively long exposure times will result. On the other hand, if the beam impinges on the screen directly, as through holes in the foil supporting the object to be studied, excessively short exposure times will result.

It is, therefore, the primary object of this invention to provide an improved method and means for the automatic control of time of exposure of film to the beam of charge carriers.

It is a further object of this invention to provide method and means for controlling exposure times in charge carrier beam apparatus which is effective over a large exposure range and also for short exposure intervals.

In accordance with these objects, the method comprises measuring the current density of the beam in a preselected part of the image plane, transforming the current density into a voltage the amplitude of which is proportional to current density, storing the voltage, transforming the stored amplitude into a time duration, and controlling the exposure by the time duration. The stored signal amplitude is proportional to the current density of the beam in said preselected part of the image plane, while the time duration is inversely proportional to the stored amplitude.

The apparatus in accordance with the invention contains an amplifier connected with the collector electrode arranged in the charge-carrier-beam apparatus, a storage condenser coupled to said amplifier, a device serving to convert the storage voltage into a time value, and a shutter arranged in the beam path, means for disconnecting the amplifier from the storage condenser upon the opening of the shutter and means for automatically closing the shutter in accordance with the time value given by the storage voltage.

It is advantageous to develop the collector electrode as a part of the fluorescent screen arranged in the apparatus and to give it such a surface that it fills up the field of view of the photomicroscope serving for the optical enlargement of the fluorescent screen image. Since the image, for instance in an electron microscope, is always set to this point, erroneous exposures are avoided from the very start by this measure.

The device serving to convert the storage voltage into a time value consists advantageously of a comparison condenser which is charged to a given preliminary voltage, a variable resistor connected in series with the said condenser and a thyratron which is connected in parallel to the condenser with respect to its control-grid-cathode path. The striking voltage of the thyratron, is in this connection, so adjusted that it corresponds to a given fraction of the initial voltage of the comparison condenser.

The manner of operation of this device is as follows: Upon the opening of the shutter, the storage condenser is disconnected from the amplifier by switches coupled to said shutter release and the device serving to establish the value of the exposure time is connected with the storage condenser. The comparison condenser is in this connection connected in pole opposition with the storage condenser so that after this connection is made an equalization of the charge of the two condensers takes place during which the potential at the control grid of the thyratron approaches the firing voltage. As soon as the firing voltage is reached, current flows through the thyratron and via a relay, effects the closing of the shutter.

It is advisable in electron microscopes to arrange the photographic plate, seen in the direction of the beam, below the final image fluorescent screen so that the fluorescent screen must be swung out of the beam path for the exposure. In this connection, the shutter release is advantageously so coupled with the device used to move the fluorescent screen out of the beam path so that the shutter release is actuated only after the fluorescent screen has been moved completely out of the path of the electron beam.

The shutter itself can be designed, for instance as between lens or focal plane shutter and is arranged in the image space of the projecting lens. Its actuation is advantageously effected via a relay which is connected with the thyratron of the timer member.

Figure 2:
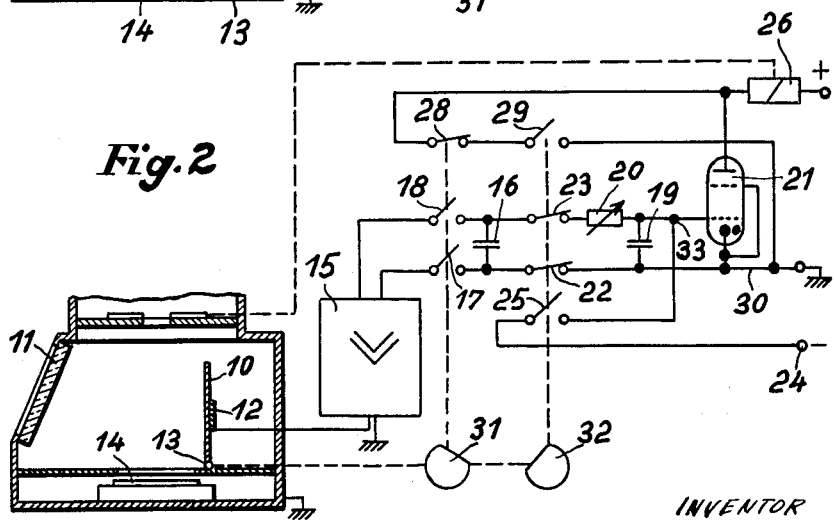

This invention will be more clearly understood by reference to the following description taken in combination with the accompanying drawing, of which:

FIG. 1 is a partially sectioned view, in schematic form, of an electron microscope equipped with the new device for automatically regulating the exposure time; and FIG. 2 is a partial view of the device shown in FIG. 1 in the position reached upon the taking of the picture.

In FIG. 1 there is shown an electron microscope comprising a cathode 1, modulator electrode 2 and the anode 3 of an electron beam producing system. The anode 3 is at ground potential while all other electrodes are at high-voltage potential. The electron beam produced by the beam producing system is designated 4. This beam passes through a grounded diaphragm 5 which determines the maximum exposure aperture and strikes the object 6 which is to be observed. By means of an objective lens 7 another diaphragm 8 and a projecting lens 9, an image of the object 6 is produced on a fluorescent screen 10.

This fluorescent screen can be observed through a window 11.

The fluorescent screen 10 is connected with a small collector 12 which is insulated therefrom and which is also developed as fluorescent screen. The screen can be swung about an axis 13. Below the fluorescent screen 10, there is arranged a photographic plate 14 which is suitable for the production of photographic pictures by means of charge carriers.

To the collector electrode 12 there is connected a D.C. voltage amplifier 15 which in its turn is connected via switches 17 and 18 with the storage condenser 16.

The device serving to convert the storage voltage of the condenser 16 into a time value, consists of the comparison condenser 19, the variable resistor 20 and the thyratron 21. By means of switches 22 and 23, this device can be connected with the storage condenser 16. The charging of the comparison condenser 19 to a given negative initial voltage is effected from a contact 24 via a switch 25 connected with the switches 22 and 23.

In the anode line of the thyratron 21, there is arranged an electromagnetic relay 26. This relay actuates the mechanical shutter 27 arranged below the projecting lens 9, through a conventional hermetically sealed coupling extending through the wall of microscope. Such sealed couplings are known and are thus not illustrated in detail.

The relay 26 is connected via further switches 28 and 29 with the ground line 30. The switch 28 is ganged with the switches 17 and 18, while the switch 29 is ganged with the switches 22, 23 and 25. A cam 31 serves to actuate the switches 17, 18, 28; the cam 32 serves to actuate switches 25, 22, 23, 29. The two cams 31 and 32 are mechanically coupled with the flap device for the fluorescent screen 10 and are also turned upon the swinging of the fluorescent screen about the pin 13.

The manner of operation of the device described here is as follows: If a photographic picture is to be taken, starting from the rest or first position shown in FIG. 1, the fluorescent screen 10 is first of all swung about the pin 13. Upon the commencement of this swinging movement, the switch 28 is closed via the cam 31. As a result, a current flows through the relay 26 which closes the shutter. Simultaneously with the closing of the switch 28, the two switches 17 and 18 open, so that the storage condenser 16 is now disconnected from the amplifier 15.

After the fluorescent screen has been completely swung out of the beam path of the electron beam 4 to the second position, as shown in FIG. 2, the switch 29 is opened by means of the cam 32. In this way the flow of current through the relay 26 is interrupted and the shutter 27 is opened. The electron beam 4 can thus strike without obstruction on the photographic plate 14. At the same time, the switch 25 is opened so that therefore the comparison condenser 19 is disconnected from the negative bias voltage. Simultaneously with the opening of the two switches 25 and 29, the switches 22 and 23 are closed. In this way the two condensers 16 and 19 are connected with each other via the resistor 20. An equalization of charge now takes place via this resistor, the potential at point 33 becoming more and more positive. As soon as the potential at this point has reached the adjusted firing voltage of the thyratron 21, the thyratron fires and current flows through the relay 26. This relay now closes the shutter 27 and the taking of the picture is complete.

The fluorescent screen 10 can now be swung back into its normal position, as shown in FIG. 1. During this swinging, the switch 29 is first of all closed via the cam 32. Since the switch 28 is still closed, the anode of the thyratron 21 receives a voltage of zero and the thyratron is extinguished. At the same time, current flows through the relay 26 so that the shutter 27 still remains closed. Simultaneously with the closing of the switch 29 the switch 25 closes and the two switches 22 and 23 open. In this way the two condensers 16 and 19 are separated and the negative comparison voltage is again applied to the comparison condenser 19.

Shortly before the fluorescent screen 10 has completely swung back into position, the switch 28 is opened by the cam 31. The current through relay 26 is cut off and the shutter 27 is opened.

Simultaneously with the opening of switch 28, the two switches 17 and 18 are closed so that the storage condenser 16 is again connected to the amplifier 15. By suitable dimensioning of the capacitance of the storage condenser 16, the capacitance of the comparison condenser 19, the variable resistance 20 and the negative comparison voltage 24, it is possible with the device shown here within a very large exposure time interval of about 1:200 to satisfy in very good approximation of the physical requirement for uniform density, namely that the product of the electron current density times the exposure time be constant. The exposure errors which occur in this connection can be made less than 10% over the entire exposure-time range.

In order to avoid excessively large charging times of the storage condenser 16, the time constant of the capacitor 16 and the associated charging resistance in the amplifier output is less than 3 seconds and preferably about a half a second. Furthermore, the capacitance ratio of the storage condenser to the comparison condenser is selected at less than 1 and preferably about ¼. The negative comparison voltage 24 is preferably so adjusted that upon the connecting of the discharged storage condenser 16 with the comparison condenser 19 which has been charged to the negative bias voltage, the firing voltage is obtained at the control grid of the thyratron 21 after a very long time, about approximately 10 minutes. In this way, the requirement that in this case the exposure time itself must be infinitely large is satisfied with sufficient accuracy.

By means of the variable resistance 20 the exposure time factor can be adapted to the sensitivity (speed) of the specific photo emulsion used.

This invention may be variously embodied and modified within the scope of the subjoined claims.

What is claimed is:

1. Apparatus for automatically controlling exposure time of films to the electron beam of an electron microscope which is provided with an electron beam generator to generate said electron beam, an object the enlarged image of which is to be studied mounted in the path of said electron beam, means for mounting a photographic film and positioning said film in the path of the electron beam, a fluorescent screen hingedly mounted and being swingable about said hinge from a first position overlying said film and interrupting said beam from impinging on said film to a second position out of the path of the electron beam, the electron optical lenses consisting of at least one objective and one projecting lens for producing an enlarged image of said object on said fluorescent screen when said fluorescent screen is in said first position, a shutter arranged in front of said fluorescent screen, and relay means to open and close said shutter, comprising a collector electrode mounted on said fluorescent screen, storage means coupled to said collector electrode and serving to store a signal the amplitude of which is proportional to the signal delivered by the collector electrode, means to convert the storage signal into a timing signal, the duration of which is inversely proportional to the amplitude of the stored signal, means for closing said shutter and for uncoupling said storage means from said collector electrode and for coupling said storage means to said converting means when said fluorescent screen is swung from said first position to said second position, and means coupled to said converting means and serving to open said shutter after the fluorescent screen has reached said second position and to shut said shutter at the end of said timing signal.

2. Apparatus for automatically controlling exposure time of films to the electron beam of an electron microscope which is provided with an electron beam generator, an object the enlarged image of which is to be studied mounted in the path of said electron beam, means for mounting the photographic film and positioning said film in the path of the electron beam, a fluorescent screen hingedly mounted and being swingable about said hinge from a first position overlying said film and interrupting said beam from impinging on said film to a second position out of the path of the electron beam, electron optical lenses consisting of at least one objective and one projecting lens for producing an enlarged image of said object on said fluorescent screen when said fluorescent screen is in said first position, a shutter arranged in front of said fluorescent screen, and relay means to open and close said shutter, comprising: a collector electrode mounted on said fluorescent screen; a storage condenser coupled to said collector electrode and adapted to store a signal the amplitude of which is proportional to the current density of the electron beam striking said collector electrode when said screen is in said first position; a comparison condenser charged to a given initial voltage; a variable resistor serially connected with said comparison condenser; said storage condenser, comparison condenser and variable resistor combining to convert said stored signal into a time interval; a thyratron; said comparison condenser being coupled between a grid and cathode of said thyratron; means for closing said shutter, for uncoupling said storage condenser from said collector electrode, and for coupling said storage condenser across the series connected combination of said comparison condenser and variable resistor when said fluorescent screen is swung from said first position to said second position; and means to open said shutter after said fluorescent screen has reached said second position and to shut said shutter after a time interval inversely proportional to the current density of said impinging electron beam.

3. Apparatus according to claim 2 in which the firing voltage of the thyratron corresponds to a given fraction of the initial voltage of the comparison condenser.

4. Apparatus according to claim 2 in which the product of the capacitance of the storage condenser and the charging resistance of the storage condenser is less than 3 seconds.

5. Apparatus according to claim 2 in which the ratio of capacitances of the storage condenser to the comparison condenser is less than 1.

6. Apparatus in accordance with claim 2 in which said relay means comprises a relay to shut said shutter when said relay is energized, said relay being coupled between a power supply and the anode of said thyratron so as to close said shutter upon firing of said thyratron.

7. Apparatus according to claim 6 which includes switches to cut off the relay current and thus open the shutter when said fluorescent screen is positioned in said first and second positions.

8. Apparatus according to claim 6 in which the comparison condenser which determines the exposure time is connected with a source of bias voltage via a switch which is closed only when said fluorescent screen is in said first position.

References Cited in the file of this patent
UNITED STATES PATENTS
2,463,985    Linde _____ Mar. 8, 1949